United States Patent
Lo et al.

(10) Patent No.: US 8,012,905 B2
(45) Date of Patent: Sep. 6, 2011

(54) PROCESS FOR PREPARING PLATINUM BASED ELECTRODE CATALYST FOR USE IN DIRECT METHANOL FUEL CELL

(75) Inventors: Man-yin Lo, Hsinchu (TW); I-Hsuan Liao, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 12/911,825

(22) Filed: Oct. 26, 2010

(65) Prior Publication Data

US 2011/0036202 A1    Feb. 17, 2011

Related U.S. Application Data

(62) Division of application No. 11/448,889, filed on Jun. 8, 2006, now Pat. No. 7,829,496.

(30) Foreign Application Priority Data

Dec. 28, 2005    (TW) .............................. 94147089 A

(51) Int. Cl.
  *B01J 23/42* (2006.01)
  *B01J 23/56* (2006.01)

(52) U.S. Cl. ........... 502/339; 423/22; 502/325; 502/326

(58) Field of Classification Search .................... 423/22; 502/325, 326, 339

See application file for complete search history.

(56) References Cited

U.S. PATENT DOCUMENTS

| 6,462,095 | B1 | 10/2002 | Bonsel |
| 7,160,525 | B1 | 1/2007 | Peng et al. |
| 2004/0087441 | A1 | 5/2004 | Bock et al. |
| 2006/0057502 | A1 | 3/2006 | Okada et al. |

FOREIGN PATENT DOCUMENTS

| CA | 2518311 A1 * | 9/2004 |
| WO | 2005092784 A1 | 6/2005 |

OTHER PUBLICATIONS

International Search Report for IN2004/000072 dated Dec. 3, 2004.

* cited by examiner

*Primary Examiner* — Stanley Silverman
*Assistant Examiner* — Brian Walck
(74) *Attorney, Agent, or Firm* — Bacon & Thomas, PLLC

(57) ABSTRACT

A method for preparing platinum (Pt) based nano-size catalyst which is useful as an electrode catalyst of a direct methanol fuel cell (DMFC). This method includes the implementation of a reduction reaction of a platinum precursor and an optional ad-metal precursor with a reducing agent in a solvent and in the presence of a stabilizer to form a suspension containing colloidal particles of platinum or platinum/ad-metal; mixing the suspension with a co-solvent; subjecting the resultant mixture to a centrifugal treatment to form a platinum or platinum/ad-metal colloidal particle portion and a liquid portion, repeating the co-solvent mixing and centrifugal treatment to the platinum or platinum/ad-metal colloidal particle portion until the resultant liquid portion no longer contains the product of the reduction reaction; and drying the resultant platinum or platinum/ad-metal colloidal particle portion to obtain a platinum based nano-size catalyst.

9 Claims, 1 Drawing Sheet

PROCESS FOR PREPARING PLATINUM BASED ELECTRODE CATALYST FOR USE IN DIRECT METHANOL FUEL CELL

CROSS REFERENCE TO RELATED APPLICATIONS

This application is a divisional of U.S. application Ser. No. 11/448,889 filed on Jun. 8, 2006, now U.S. Pat. No. 7,829,496, the entire disclosure of which is herein incorporated by reference and which has a claim of priority to Taiwanese application no. 94147089 filed on Dec. 28, 2005.

FIELD OF THE INVENTION

The present invention is related to a method for preparing platinum nano-size catalyst, which can be used as the electrode catalyst (including positive electrode and negative electrode) for direct methanol fuel cell.

BACKGROUND OF THE INVENTION

The preferable electrode catalyst for use in the direct methanol fuel cell (DMFC) is the ones made of platinum or platinum alloy. There is a suitable method for preparing catalysts made of platinum or platinum alloy, which is the colloidal stabilization method. This method involves the implementation of a reduction reaction of a platinum precursor or a platinum alloy precursor with a reducing agent, which is carried out in a solvent and in the presence of a stabilizer, in order to form a suspension containing colloidal particles of platinum or platinum alloy. Because the stabilizer cannot be removed easily, the colloidal platinum or platinum alloy catalyst as obtained is generally used for catalysis directly, or is used to deposit on a carrier then subject the carrier to temperature higher than 200° C. to remove the stabilizer, prior to its use in catalysis. However, the presence of the stabilizer, or the removal of the stabilizer at temperature higher than 200° C., both have adverse effects on the use of platinum or platinum alloy catalyst as DMFC electrode catalyst.

In U.S. Patent 2004/0087441A1, a colloidal stabilization method for preparing platinum or platinum alloy catalyst is disclosed, wherein ethylene glycol is used as the solvent, the reducing agent, and the stabilizer at the same time. Since this method uses only ethylene glycol, it is possible to use the electrochemical oxidation method and/or heating to a temperature less than 200° C. in air to remove the products generated from reduction reaction from the platinum or platinum alloy catalyst. As a result, the adverse effects on platinum or platinum alloy catalyst mentioned in the previous paragraph can be prevented. In this method, the resultant particle size of the platinum or platinum alloy catalyst (between 0.8 to 10 nm) can be adjusted by altering the concentration of NaOH in the reaction compounds. The method can further comprise a step in which a carrier is added to the reaction mixture before reduction reaction is carried out, so that platinum or platinum alloy catalyst can be deposited on a carrier. The method can also further comprise another step in which a carrier is immersed in a suspension resulting from reduction reaction, or coated with particles of platinum or platinum alloy catalyst, so that carriers that has been coated with platinum or platinum alloy catalyst can be obtained. The disclosures of U.S. Patent 2004/0087441A1 is incorporated herein by reference.

Although U.S. Patent 2004/0087441A1 has improved the method for preparing platinum or platinum alloy catalyst, the method of electrochemical oxidation and/or heating to temperature less than 200° C. in air to remove the products generated from reduction reaction from the platinum or platinum alloy catalyst is still less than ideal, and can only be used when ethylene glycol is used as the solvent, the reducing agent, and stabilizer at the same time.

SUMMARY OF THE INVENTION

A primary objective of the present invention is to provide a method for preparing platinum based nano-size catalyst, which can be used as the electrode catalyst for direct methanol fuel cell. This method includes carrying out a reduction reaction of a platinum precursor and an optional additional (ad-)metal precursor with a reducing agent in a solvent and in the presence of a stabilizer to form a suspension containing colloidal particles of platinum or platinum/ad-metal; mixing the suspension with a co-solvent; subjecting the resultant mixture to a centrifugal treatment to form a platinum or platinum/ad-metal colloidal particle portion and a liquid portion, repeating the co-solvent mixing and centrifugal treatment to the platinum or platinum/ad-metal colloidal particle portion until the resultant liquid portion no longer contains the side product of the reduction reaction; and drying the resultant platinum or platinum/ad-metal colloidal particle portion to obtain a platinum based nano-size catalyst.

DETAILED DESCRIPTION OF THE INVENTION

Figure 1:
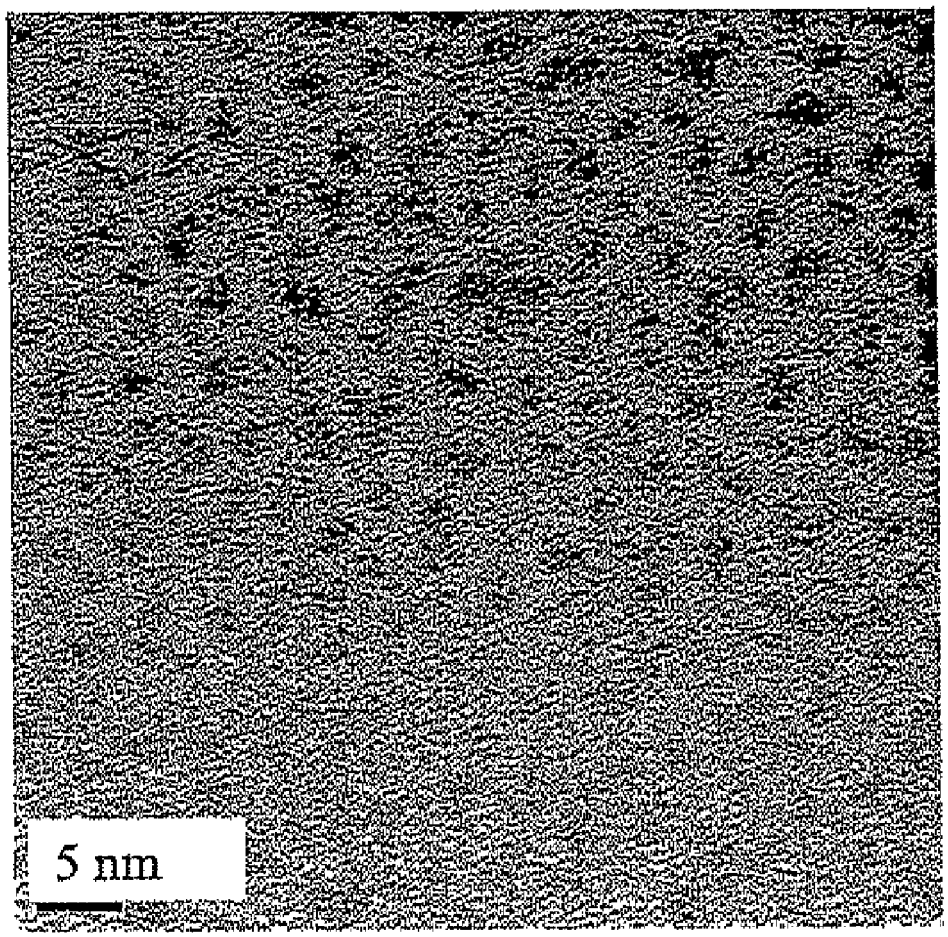
FIG. 1 shows the photograph of platinum black catalyst prepared in Example 2 of the present invention, which is taken under a transmission electronic microscope (TEM).

Preferred embodiments of the present invention include (but not limited thereto) the following:

1. A method for preparing a platinum based nano-size catalyst comprising the following steps:
    a) carrying out a reduction reaction of a platinum precursor and an optional ad-metal precursor with a reducing agent in a solvent and in the presence of a stabilizer, in order to form a suspension containing colloidal particles of platinum or platinum/ad-metal;
    b) mixing the resulting suspension with a co-solvent;
    c) subjecting the resulting mixture to centrifugal treatment, thereby giving rise to platinum or platinum/ad-metal colloidal particle portion and a liquid portion;
    d) repeating the co-solvent mixing and centrifugal treatment to the platinum or platinum/ad-metal colloidal particle portion, until the resulting liquid portion substantially does not contain a product of the reduction reaction; and
    e) drying the platinum or platinum/ad-metal colloidal particle portion to obtain a platinum based nano-size catalyst.

2. The method of Item 1, wherein the co-solvent used in step b) is acetone, $C_3$-$C_{12}$ aliphatic alkane or toluene.

3. The method of Item 2, wherein the $C_3$-$C_{12}$ aliphatic alkane is pentane.

4. The method of Item 1, wherein the solvent, reducing agent, and stabilizer used in step a) is ethylene glycol.

5. The method of Item 2, wherein the solvent, reducing agent, and stabilizer used in step a) is ethylene glycol.

6. The method of Item 3, wherein the solvent, reducing agent, and stabilizer used in step a) is ethylene glycol.

7. The methods of Item 1, wherein in step a), the solvent is a mixed solution of $H_2O$ and ethanol, the reducing agent is ethanol, and the stabilizer is polyvinyl pyrrolidone (PVP).

8. The methods of Item 2, wherein in step a), the solvent is a mixed solution of $H_2O$ and ethanol, the reducing agent is ethanol, and the stabilizer is polyvinyl pyrrolidone (PVP).

9. The methods of Item 3, wherein in step a), the solvent is a mixed solvent of $H_2O$ and ethanol, the reducing agent is ethanol, and the stabilizer is polyvinyl pyrrolidone (PVP).

10. The method of Item 4, wherein the platinum precursor used in step a) is chloroplatinic acid ($H_2PtCl_6$), and the product of the reduction reaction in step d) is chloride ions.

11. The method of Item 7, wherein the platinum precursor used in step a) is chloroplatinic acid ($H_2PtCl_6$), and the product of the reduction reaction in step d) is chloride ions.

12. The method of Item 10, in which the liquid portion in step d) contains less than 300 ppm of chloride ions.

13. The method of Item 11, in which the liquid portion in step d) contains less than 300 ppm of chloride ions.

14. The method of Item 1, wherein the platinum precursor used in step a) is chloroplatinic acid ($H_2PtCl_6$), bis(acetylacetonato) platinum (II), dinitrodiaminoplatinum (II) (Pt$(NH_3)_2(NO_2)_2$), or tetraminoplatinum (II).

15. The method of Item 1, wherein the solvent used in step a) is ethylene glycol or a mixed solvent of $H_2O$ and alcohol.

16. The method of Item 1, wherein the reducing agent used in step a) is ethanol, ethylene glycol, sodium borohydride, hydrazines, or formaldehyde.

17. The method of Item 1, wherein the stabilizer used in step a) is polyvinyl pyrrolidone (PVP), polyol, polyvinyl alcohol, or sodium bis(2-ethylhexyl) sulfosuccinate (AOT).

The present invention can be more fully comprehended by reading the following examples, which only serve as examples and are not to be used to limit the scope of the present invention.

EXAMPLE 1

0.125 g of chloroplatinic acid ($H_2PtCl_6$) was dissolved in 250 ml of $H_2O$/ethanol solution, in which the volume ratio between $H_2O$ and ethanol is 2:3. Then polyvinyl pyrrolidone (PVP) was added, in which the weight ratio between platinum and PVP was 0.12:1. After sonicating the resulting mixture for 30 minutes, it was then heated to and maintained at 90° C. for 1 hour, thereby giving rise to a suspension of colloidal particles of platinum. After the heating was ceased, the suspension was kept at room temperature for 1 year, in which colloidal particles still remained without precipitation. The suspension was mixed with 150 ml of a mixed solvent of ethylene glycol/acetone, wherein the volume ratio between ethylene glycol and acetone is 1:6. The mixture was then subjected to sonication for 30 minutes followed by centrifugal treatment; and the liquid portion resulting from the centrifugal treatment was analyzed by using an ion chromatography (IC) in order to measure the amount of chloride therein. The ethylene glycol/acetone solvent mixing (the volume used for mixing was 300 ml) and centrifugal treatment were repeated to the solid portion resulting from the centrifugal treatment, until the amount of chloride contained in the liquid portion resulting from centrifugal treatment measured by the IC analysis was lower than 300 ppm. The number of the repeating was six times in total. The solid portion resulting from the last centrifugal treatment was dried by baking (110° C., 12 hours), which gave rise to platinum black catalyst. Its average particle diameter of the platinum black catalyst is 2.3 nm, which was obtained by the use of a transmission electron microscope. The activity of the catalyst prepared in this Example was tested by electrocatalytic oxygen reduction reaction (ORR) with a rotating disc electrode (RDE), and the current density was found to be 6.3 mA/mg Pt (Table 1).

EXAMPLE 2

1.935 g of chloroplatinic acid ($H_2PtCl_6$) was dissolved in 150 ml of ethylene glycol solution, then its pH value was adjust to between 12~12.2 by using a concentrated NaOH/EG solution, and the pH-adjusted solution was then subjected to sonication for 30 minutes followed by heating to 140° C. and maintained at this temperature for 1 hour, thereby resulting in a suspension of colloidal particles of platinum. After the heating was ceased, the suspension was kept at room temperature for 1 year, in which colloidal particles still remained without precipitation. The suspension was mixed with 150 ml of a mixed solvent of ethylene glycol/pentane, wherein the volume ratio between ethylene glycol and pentane is 1:6. The mixture was then subjected to sonication for 30 minutes followed by centrifugal treatment. Repeat the ethylene glycol/pentane solvent mixing (the volume used for mixing is 300 ml) and centrifugal treatment to the solid portion resulting from the centrifugal treatment, until the amount of chloride contained in the liquid portion resulting from the centrifugal treatment, which was measured by IC analysis, was lower than 300 ppm (repeated for a total of 6 times). The solid portion resulting from the last centrifugal treatment was dried by baking (110° C., 12 hours), which subsequently gave rise to platinum black catalyst. By the analysis of a transmission electron microscope, the average particle diameter of the platinum black catalyst was found to be 2.2 nm, as shown in FIG. 1. The activity of the catalyst prepared in this Example was tested by electrocatalytic ORR with RDE, and the current density was found to be 10.6 mA/mg Pt.

EXAMPLE 3

1.935 g of chloroplatinic acid ($H_2PtCl_6$) was dissolved in 150 ml of ethylene glycol solution, then its pH value was adjust to between 12~12.2 by using a concentrated NaOH/EG solution, and the pH-adjusted solution was then subjected to sonication for 30 minutes followed by heating to 140° C. and maintained at this temperature for 1 hour, thereby resulting in a suspension of colloidal particles of platinum. After the heating was ceased, the suspension was kept at room temperature for 1 year, in which colloidal particles still remained without precipitation. The suspension was mixed with 150 ml of a mixed solvent of ethylene glycol/toluene, wherein the volume ratio between ethylene glycol and toluene is 1:6. The mixture was then subjected to sonication for 30 minutes followed by centrifugal treatment. Repeat the ethylene glycol/toluene solvent mixing (the volume used for mixing is 300 ml) and centrifugal treatment to the solid portion resulting from the centrifugal treatment, until the amount of chloride contained in the liquid portion resulting from the centrifugal treatment, which was measured by IC analysis, was lower than 300 ppm (repeated for a total of 6 times). The solid portion resulting from the last centrifugal treatment was dried by baking (110° C., 12 hours), which subsequently gave rise to platinum black catalyst. By the analysis of a transmission electron microscope, the average particle diameter of the platinum black catalyst was found to be 2.2 nm. The activity of the catalyst prepared in this Example was tested by electrocatalytic ORR with RDE, and the current density was found to be 10.0 mA/mg Pt.

TABLE 1

The comparison of catalyst activity

| Example | Pt/EG (g/ml) | PVP (g) | Co-solvent | Temp. (°C.) | Time (Hr) | TEM particle diameter (nm) | Current Density (mA/mg Pt@0.9 V) |
|---|---|---|---|---|---|---|---|
| Ex. 1 | 0.125/0 | 1.07 | EG/acetone | 90 | 1 | 2.3 | 6.3 |
| Ex. 2 | 1.943/150 | — | EG/pentane | 140 | 1 | 2.2 | 10.6 |
| Ex. 3 | 1.943/150 | — | EG/toluene | 140 | 1 | 2.2 | 10.0 |
| JMBlack[1] | — | — | — | — | — | ~5 | 5.4 |

[1]JMBlack: Johnson Matthey Company, number HiSPEC 1000 platinum catalyst.

The invention claimed is:

1. A method for preparing a platinum based nano-size catalyst comprising the following steps:
   a) carrying out a reduction reaction of a platinum precursor and an optional ad-metal precursor with a reducing agent in a solvent and in the presence of a stabilizer, in order to form a suspension containing colloidal particles of platinum or platinum/ad-metal, wherein the solvent is a mixed solution of $H_2O$ and ethanol, the reducing agent is ethanol, and the stabilizer is polyvinyl pyrrolidone (PVP), polyol, polyvinyl alcohol, or sodium bis(2-ethylhexyl) sulfosuccinate (AOT);
   b) mixing the resulting suspension with a co-solvent;
   c) subjecting the mixture of step b) to centrifugal treatment, thereby giving rise to platinum or platinum/ad-metal colloidal particle portion and a liquid portion;
   d) repeating the co-solvent mixing and centrifugal treatment to the platinum or platinum/ad-metal colloidal particle portion, until the resulting liquid portion substantially does not contain a product of the reduction reaction; and
   e) drying the platinum or platinum/ad-metal colloidal particle portion to obtain a platinum based nano-size catalyst;
   wherein the co-solvent is a mixture of ethylene glycol and acetone or a mixture of ethylene glycol and $C_3$-$C_{12}$ aliphatic alkane.

2. The method of claim 1, wherein the co-solvent is a mixture of ethylene glycol and $C_3$-$C_{12}$ aliphatic alkane, and the $C_3$-$C_{12}$ aliphatic alkane is pentane.

3. The method of claim 1, wherein in step a), the solvent is a mixed solution of $H_2O$ and ethanol, the reducing agent is ethanol, and the stabilizer is polyvinyl pyrrolidone (PVP).

4. The methods of claim 2, wherein in step a), the solvent is a mixed solvent of $H_2O$ and ethanol, the reducing agent is ethanol, and the stabilizer is polyvinyl pyrrolidone (PVP).

5. The method of claim 3, wherein the platinum precursor used in step a) is chloroplatinic acid ($H_2PtCl_6$), and the product of the reduction reaction in step d) is chloride ions.

6. The method of claim 1, wherein the platinum precursor used in step a) is chloroplatinic acid ($H_2PtCl_6$), and the product of the reduction reaction in step d) is chloride ions.

7. The method of claim 5, in which the liquid portion in step d) contains less than 300 ppm of chloride ions.

8. The method of claim 6, in which the liquid portion in step d) contains less than 300 ppm of chloride ions.

9. The method of claim 1, wherein the platinum precursor used in step a) is chloroplatinic acid ($H_2PtCl_6$), bis(acetylacetonato) platinum (II), dinitrodiaminoplatinum (II) ($Pt(NH_3)_2(NO_2)_2$), or tetraaminoplatinum (II).

* * * * *